Aug. 7, 1956     N. S. McEWEN     2,757,759
BRAKE
Filed June 1, 1953
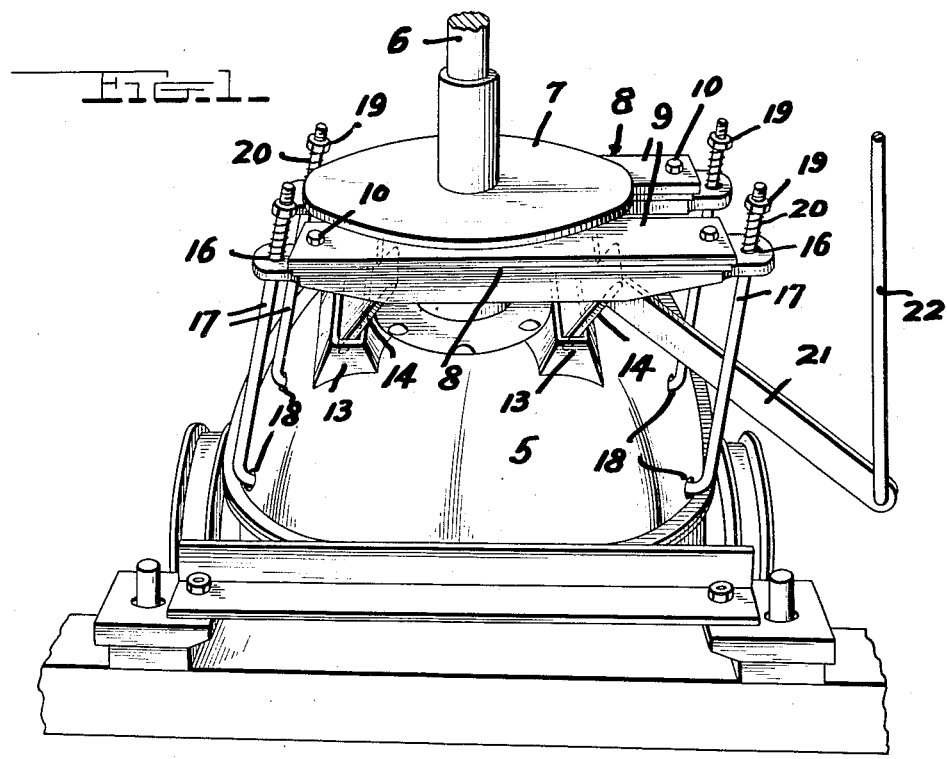
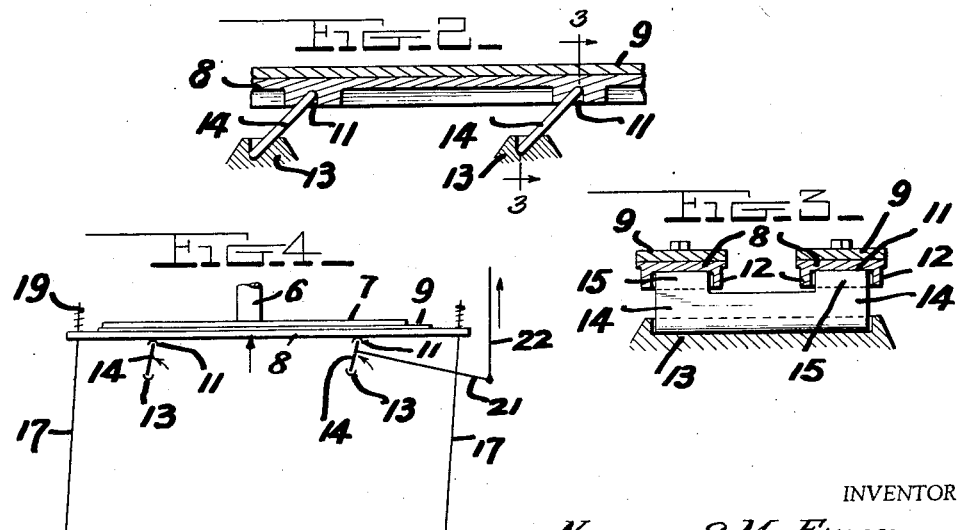
INVENTOR
*Norman S. McEwen*
BY *Dwight B. Barr*
ATTORNEY

United States Patent Office 2,757,759
Patented Aug. 7, 1956

2,757,759

BRAKE

Norman S. McEwen, Fort Lauderdale, Fla., assignor to The Uni-Mac Company, Division of Helpy Selfy Service System Inc., Fort Lauderdale, Fla., a corporation of Florida Application June 1, 1953, Serial No. 358,620

7 Claims. (Cl. 188—71)

This invention is a brake capable of general use but is particularly adaptable for use in connection with power driven washing apparatus.

An important object of the invention is to provide a brake structure, particularly for use in washing apparatus extractors, wherein a rotating extractor shaft may be easily and quickly brought to a standstill by simple means, in the minimum amount of time, with the least possible wear upon the braking apparatus, with no detrimental effect whatever upon the mechanism with which it is associated and with a minimum of manual exertion on the part of the machine operator.

A further and important object of the invention is to provide brake mechanism capable of exerting braking action to a rotating part over a relatively wide area, thus evenly distributing the wearing contact whereby to prolong the effectiveness not only of the brake shoe but also of the rotating surface against which it operates.

A still further object of the invention is to provide brake mechanism for use in connection with devices of the character stated which is of extremely simple construction, which involves the use of but few simple and readily assembled parts, which has its parts so constructed and assembled as to minimize the opportunity for wear, breakage or derangement, which may be readily applied to machines now in use, which may be easily operated by those usually unfamiliar with mechanical brake actions, and which will prove highly efficient and practical in use.

The foregoing objects, together with others which will appear as the description proceeds, are acomplished by means of the structure hereinafter described, illustrated in the drawings, and particularly set forth in the claims.

In the drawings:

Fig. 1 is a perspective view of the motor housing and shaft of a conventional type of laundry extractor and showing as applied thereto brake mechanism involving the invention, Fig. 2 is a fragmentary transverse sectional view taken through the brake shoe and a portion of the motor housing and illustrating the manner in which the shoe is mounted thereon, Fig. 3 is a tranverse sectional view taken substantially upon the line 3—3 of Fig. 2, and Fig. 4 is a diagrammatic view illustrating the manner in which the brake shoe is moved into or out of contact with the brake disk.

Referring now more particularly to the drawing, 5 represents the housing of a conventional motor used in connection with laundry machinery of the type here under consideration, but it will be understood that the invention is not necessarily confined to the use of machinery of this character but may generally be adaptable to machinery of various types wherein quick and positive braking actions are required for a rotating shaft or other member. In the present instance, the shaft 6 rises from the motor housing 5, and it will be understood that the upper end of the shaft 6 is operatively connected with the extractor mechanism. This shaft 6 has rigidly attached thereto a flat brake disk 7.

The brake shoes of my invention are indicated generally at 8. This shoe comprises a pair of elongated plates, each provided upon its upper surface with thicknesses of brake shoe facing material indicated at 9 secured to the shoes in any desired manner, bolts or nuts 10 being indicated in the present instance. These shoes will be disposed in horizontal alignment with one another, one upon each side of the shaft 6 in parallelism, and are so mounted as to move simultaneously with one another either into or out of contact with the lower face of the brake disk 7.

The undersurface of each of the shoes 8 is provided with a pair of spaced transversely disposed downwardly facing channels 11, said channels extending substantially throughout the width of each shoe and the ends of which are closed by depending flanges 12 as shown particularly in Fig. 3 of the drawings. These channels 11 are so located upon the underfaces of their respective shoes 8 as to be located one upon each side of the shaft 6, and the channels of the respective spaced shoes 8 are aligned with one another.

The upper portion of the motor housing 5 is provided with upstanding socket members 13, one disposed on each side of the upstanding shaft 6 and transversely with respect to the shoes 8. These socket members each receive the lower end of a rocker plate 14, the said plates extending substantially throughout the length of the socket members 13 as shown more particularly in Fig. 3. The upper edges of the rocker plates 14 are provided at their ends with upstanding members or extensions 15 to fit within the channels 11 in the underside of the shoes 8. The rocker plates 14 are of identical construction and lateral dimension so that as the plates are rocked in their socket members 13 they will move in unison to raise or lower the brake shoes 8, maintaining the latter at all times in a plane parallel with the underface of the brake disk 7. It will be observed in Fig. 2 that the sockets 13 and the channels 11 are so shaped that the side walls thereof act as stops both against downward as well as upward movement of the plate when predetermined angularity of the rocker plates has been reached.

The ends of the shoes 8 project beyond the brake facing 9 and each of said projecting ends is provided with an opening 16 to receive the upper end portion of a rod 17, the said rods being disposed in approximately vertical position with their lower ends 18 rockably mounted in the motor housing 5. The upper ends of the rods 17 are provided with nuts 19 which confine expansion springs 20 between themselves and the adjacent underlying extension of the brake shoe. This arrangement maintains the brake shoes in firm seating engagement with the underlying supporting rocker plates 14, and it is obvious that the tension of the springs 20 may be easily and accurately governed by adjustment of the nuts 19.

One of the rocker plates 14 has rigidly connected thereto an arm 21 to which is connected an operating rod 22. This arrangement is such that upon upward pull being applied to the rod, the rocker plates will be caused to move to upstanding position, but it will be understood that the arrangement may be modified if desired so that a downward action of the arm 21 will bring about a raising action of the rocker plates if desired.

In operation, with the shaft 6 rotating and the lever 21 lowered, the rocker plates will be in the position shown in Fig. 2 of the drawing. The weight of the brake shoes, in addition to the pressure exerted by the springs 20, will maintain the shoes normally in lowered or inoperative position as shown in Fig. 2, but immediately lifting action is applied to the operating rod 22, the rocker plates will move simultaneously in an upward direction at all times maintaining the same angle. This upward rocking movement of the rocker plates causes the brake shoes to be moved bodily, and in unison in an upward direction at all times in true parallelism with the brake disk 7. It will be observed, therefore, that a great amount of braking surface is provided by the facings 9 carried by the brake shoes. By this means, with the exertion of but a small amount of energy on the part of the operator, the shaft may be rapidly brought to a standstill without grabbing action and with facial contact between the brake facing material and the adjacent disk spread over a substantial area of both the disk and the facing material. This wide distribution of braking area results in a quick braking action upon the shaft without grab, without stress upon the machine and without extreme wear to the brake facing material.

I claim:

1. The combination with a motor housing having a rotating shaft projecting therefrom, a brake disk affixed to said shaft, a brake shoe disposed transversely of said shaft and interposed between said brake disk and said housing, rocker plates resting at their lower edges upon said housing and supporting said shoe at their upper edges, means tending normally to maintain said shoe out of engagement with said disk, and an arm connected to one of said rocker plates for moving the same to upright position.

2. The combination with a motor housing having a rotating shaft projecting therefrom, a disk affixed to said shaft in spaced relationship with said housing, a pair of brake shoes mounted in parallelism one on each side and transversely of said shaft and interposed between said disk and said housing, a pair of rocker plates resting at their lower ends upon said housing and disposed transversely beneath said shoes, the upper ends of said rocker plates engaging and supporting said shoes, and an arm connected to one of said plates for rocking the same.

3. The combination with a motor housing having a rotating shaft projecting therefrom, a brake disk affixed to said shaft in spaced relationship to said housing, a pair of socket members supported by said housing transversely of the axis of said shaft and one on each side of said shaft in parallelism, a pair of brake shoes disposed one on each side of said shaft between said disk and said housing and transversely of said socket members, inclined rocker plates engaged in said socket members at their lower edges and supporting said shoes at their opposite edges, the breadth of said rocker members being greater than the distance between said socket members and the underface of said disk, and means for rocking said plates in said socket members.

4. The combination with a motor housing having a rotating shaft projecting therefrom, a disk affixed to said shaft and spaced from said housing, a pair of socket members on said housing below said disk disposed in parallelism transversely of said housing one on each side of said shaft, rocker plates having their lower edges rockably seated in said socket members, a pair of brake shoes arranged in parallelism one on each side of said shaft and disposed transversely of said socket members, brake facings upon the upper surface of each of said shoes, the upper edges of said rocker plates engaging and supporting said shoes on the undersurface thereof, a lever affixed at one end to one of said rocker plates and projecting outwardly therefrom, and the breadth of said rocker plates being in excess of the distance between said socket members and the underface of said brake disk.

5. The combination with a motor housing having a rotatable shaft projecting therefrom, a brake disk affixed to said shaft in spaced relationship to said housing, a pair of socket members on said housing disposed in parallelism and one on each side of said shaft, a pair of brake shoes arranged one on each side of said shaft disposed at right angles to said socket members and interposed between said housing and said disk, said brake shoes having channels disposed transversely thereof and out of vertical alignment with said socket members, a rocker plate resting at its lower edge in each of said socket members and engaged at its upper edge in the adjacent shoe channel, and an arm connected to one of said rocker plates for rocking the latter in its socket members.

6. The combination with a motor housing having a rotatable shaft projecting outwardly therefrom, a brake disk affixed to said shaft, socket members arranged on said housing one on each side of said shaft in parallelism and between said housing and said disk, a pair of elongated brake shoes arranged between said housing and said disk and transversely of said socket members, brake facing material carried by the faces of said shoes next adjacent to said disk, each of said brake shoes having a transverse channel in its undersurface out of vertical alignment with said socket members, rocker plates engaged at their lower ends in said socket members and engaging in said channels at their upper ends, links hingedly connected at their lower ends in said housing, the ends of said shoes each having an opening therein, said links extending through said openings, nuts engaged with the protruding ends of said links, springs interposed between said nuts and the adjacent shoe ends, and an arm rigidly secured at one end to one of said rocker plates.

7. The combination with a motor housing having a rotatable shaft projecting therefrom, a pair of socket members on said housing one arranged on each side of said shaft in parallelism and disposed between said housing and said brake disk, a pair of elongated brake shoes arranged in parallelism one on each side of said shaft and disposed transversely of said socket members, each of said shoes having channels in their underfaces parallel with said socket members and out of vertical alignment with the latter, a rocker plate extending throughout the length of each of said socket members and having their lower edges resting in the latter, the opposite edges of said rocker plates engaged in said channels, and the walls of said socket members and said channels being so inclined as to be engaged by said rocker plates to limit the movement of said rocker plates in one direction.

References Cited in the file of this patent

UNITED STATES PATENTS

| | | |
|---|---|---|
| 710,759 | Coleman et al. | Oct. 7, 1902 |
| 1,464,980 | Farmer | Aug. 14, 1923 |
| 1,567,915 | Cole | Dec. 29, 1925 |
| 1,697,758 | Ernemann | Jan. 1, 1929 |
| 1,900,282 | Halbach | Mar. 7, 1933 |
| 1,958,839 | Shelor | May 15, 1934 |
| 2,052,824 | Harbarger | Sept. 1, 1936 |
| 2,163,039 | Hinricher | June 20, 1939 |
| 2,213,340 | Ellars | Sept. 3, 1940 |